(Model.)
M. M. SORNBORGER.
HAY RAKING AND ELEVATING MACHINE.
No. 461,374. Patented Oct. 13, 1891.
3 Sheets—Sheet 1.
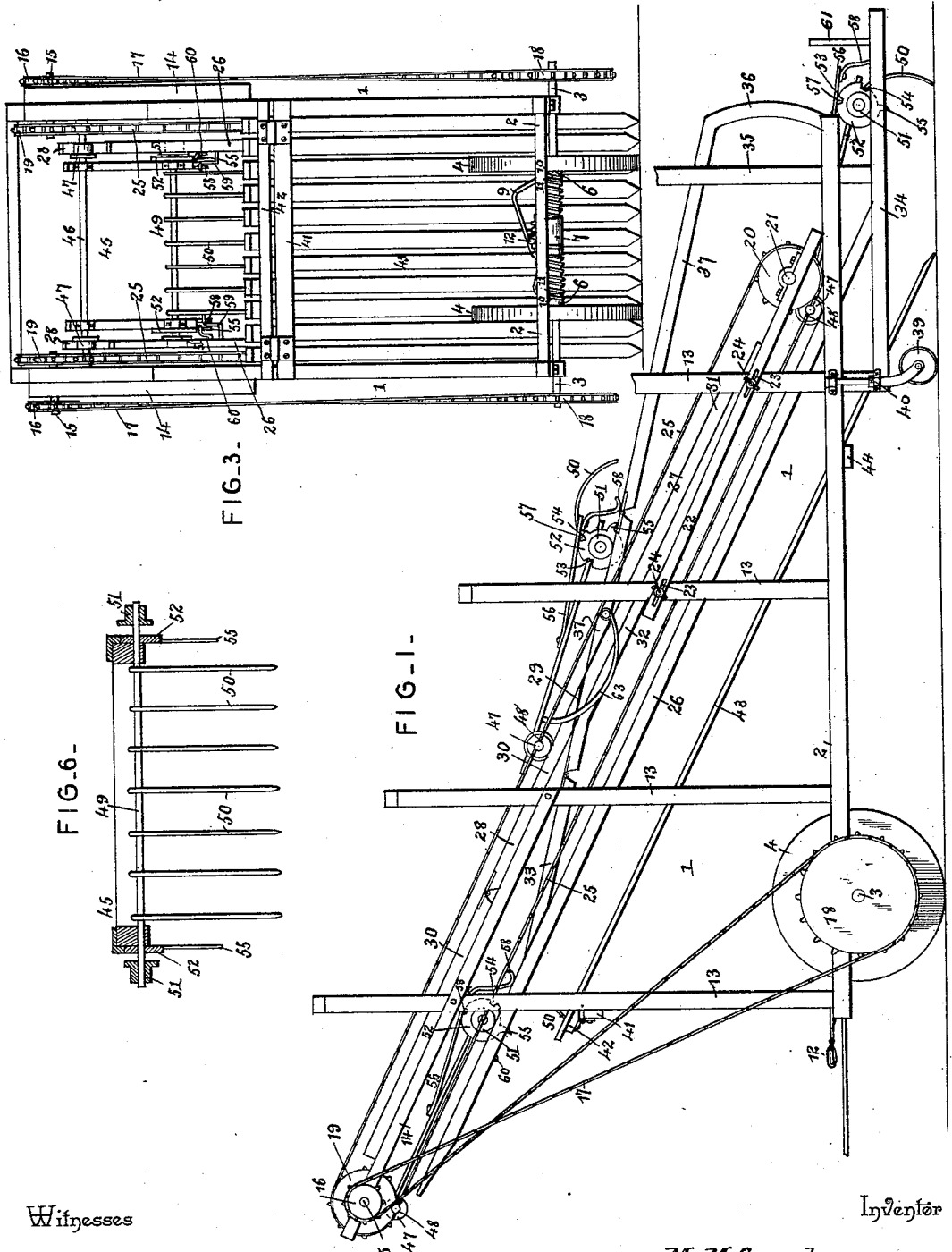
Witnesses
Jas. K. McCathran
Wm. Bagger
Inventor
M. M. Sornborger
By his Attorneys,
C. A. Snow & Co.

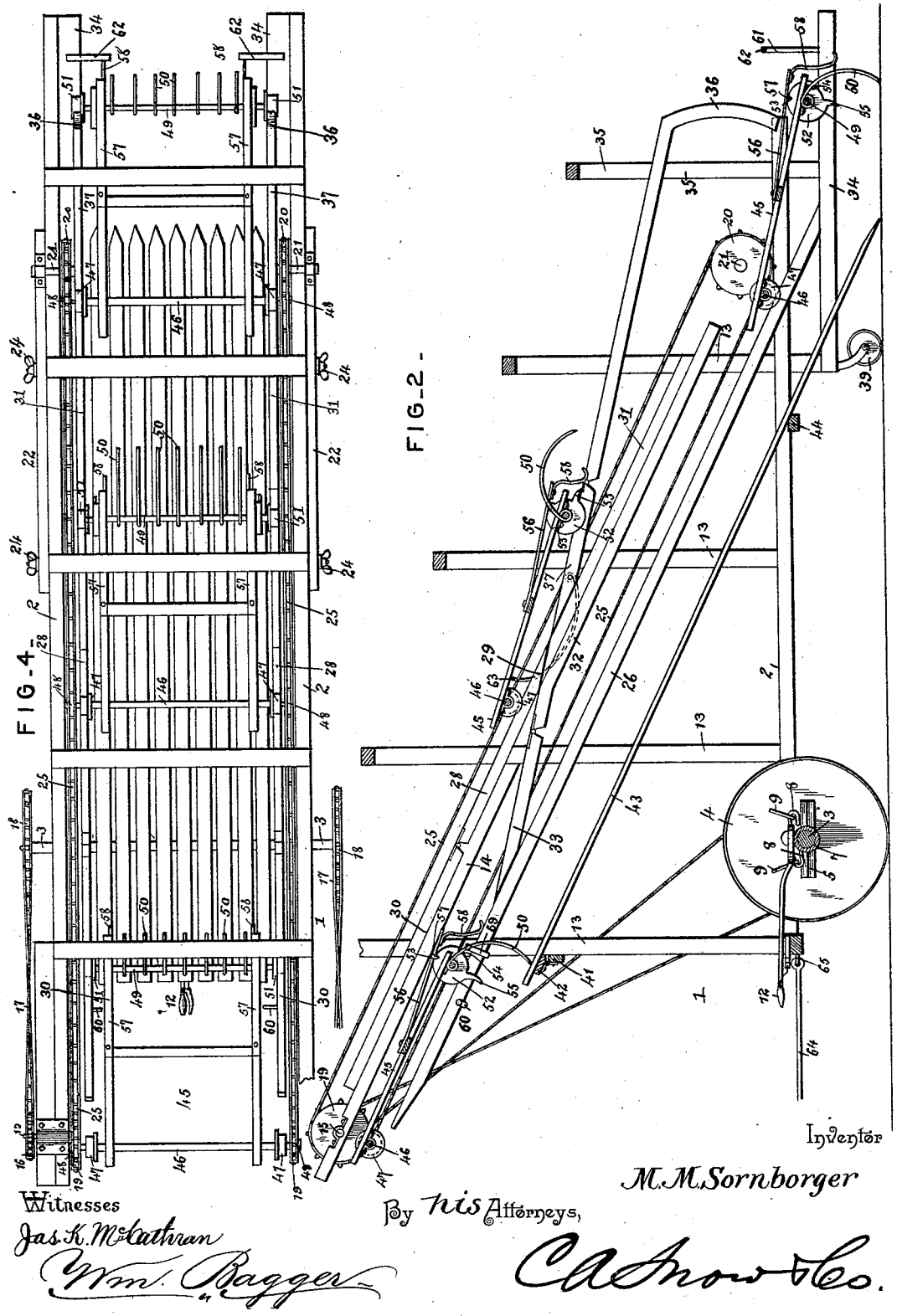

(Model.)

3 Sheets—Sheet 3.

M. M. SORNBORGER.
HAY RAKING AND ELEVATING MACHINE.

No. 461,374. Patented Oct. 13, 1891.

Witnesses
Albert Calkins
A. Berg

Inventor
Martin M. Sornborger

United States Patent Office.

MARTIN M. SORNBORGER, OF ROUND MOUNTAIN, CALIFORNIA.

HAY RAKING AND ELEVATING MACHINE.

SPECIFICATION forming part of Letters Patent No. 461,374, dated October 13, 1891.

Application filed February 17, 1885. Serial No. 156,198. (Model.)

*To all whom it may concern:*

Be it known that I, MARTIN M. SORNBORGER, of Round Mountain, in the county of Shasta and State of California, have invented certain new and useful Improvements in Hay Raking and Elevating Machines; and I do hereby declare the following to be a full, clear, and exact description of my invention, such as will enable others skilled in the art to which it pertains to make and use it, reference being had to the accompanying drawings, which form a part of this specification.

This invention relates to hay raking and elevating machines; and it has for its object to provide a device of this class in which one or more rakes are mounted upon and operated by an endless carrier composed of chains travelling over sprocket-wheels, said rakes being mounted in or attached to suitable carriages or carriers for which inclined tracks are provided, the arrangement being such that the rakes shall travel for a short distance horizontally over the ground so as to collect the hay before ascending the inclined tracks.

A further object of the invention is to so construct the machine that the hay shall be delivered or dumped at the upper end of the frame without necessity for the carriages passing around the upper guide-sprockets, thus avoiding danger of hay being carried back with the rakes.

The invention consists in the improved construction, arrangement, and combination of parts which will be hereinafter fully described, and particularly pointed out in the claims.

Figure 7:
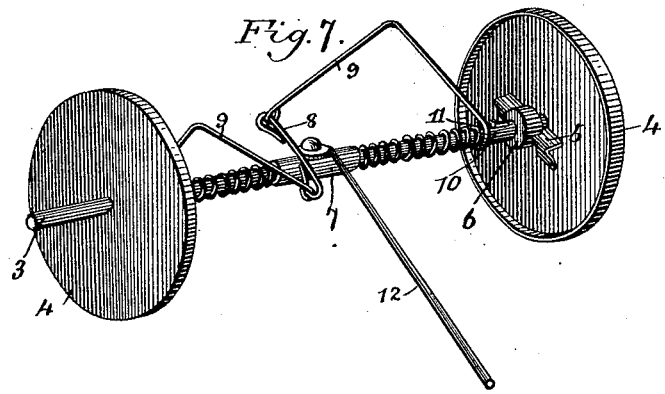
Figure 5:
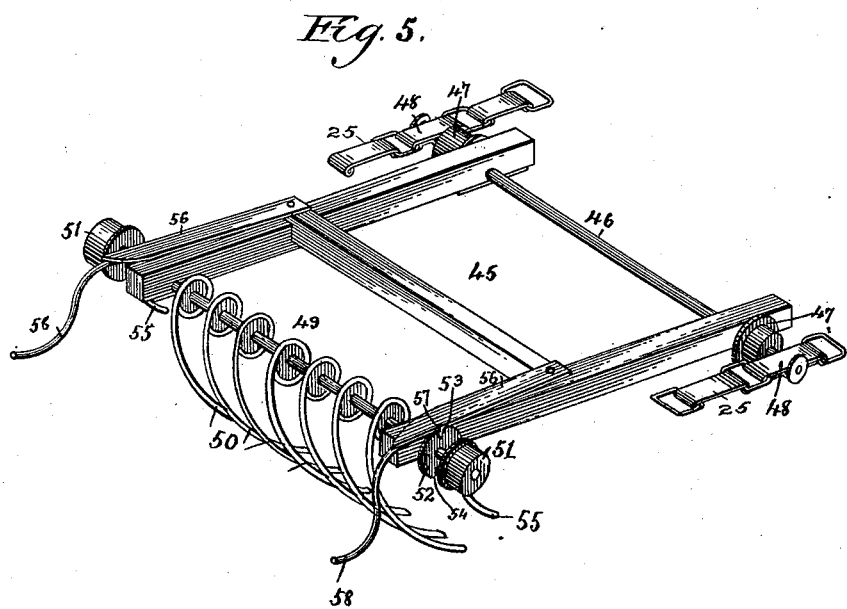

In the drawings hereto annexed, Figure 1 is a side elevation of the machine constructed in accordance with my invention. Fig. 2 is a longitudinal vertical sectional view of the same. Fig. 3 is a front elevation. Fig. 4 is a plan view. Fig. 5 is a detail view in perspective of one of the rake-carriages. Fig. 6 is a transverse sectional view of the same taken through the rake-head. Fig. 7 is a perspective detail view showing the main axle and supporting-wheels with the clutch mechanism for connecting said wheels to the axle.

Like numerals of reference indicate like parts in all the figures of the drawings.
1 designates the frame of the machine, the sills of which 2 2 have bearings for the main shaft or axle 3, carrying the transporting-wheels 4 4, which are loosely mounted upon said axle and which are provided on their inner sides with clutch members 5, adapted to be engaged by the sliding spring-actuated clutches 6. A sleeve 7, which is journaled about centrally upon the axle, has upon its upper side a pivoted cross-bar 8, the ends of which have pivoted links 9, provided with annular rings or collars 10, that engage annular grooves 11 in the clutches 6. An operating handle or lever 12 extends forwardly from the cross-bar 8, which by means of said handle may be turned upon its pivot so as to throw the clutches 6 out of engagement with the clutch members 5 upon the transporting-wheels. The handle 12 may be retained in this position by means of a suitably-arranged rack-bar, thus permitting the supporting-wheels to revolve freely upon the axle when the machine is to be transported from place to place. When the hay-elevating mechanism is to be in operation the clutch members of the transporting-wheels are to be placed in engagement with the clutches 6, thus causing the axle to rotate in its bearings and enabling motion to be taken therefrom for the purpose of operating the hay-elevating mechanism.

The sills of the frame are provided with uprights 13, the front ones of which have forwardly-extending arms 14, provided with bearings for the short shafts 15, one at each side of the machine. The shafts 15 have sprocket-wheels 16, which are connected by crossed chains 17 with sprocket-wheels 18 upon the ends of the axle, from which motion in the proper direction is thus imparted to the shafts 15. The latter are provided at their inner ends with sprocket-wheels 19. Similar sprocket-wheels 20 are mounted upon stub-axles 21 upon the inner sides of the rails 22, which are secured to the sides of the frame near the lower rear end of the latter. The rails 22 have longitudinal slots 23 to receive the securing-bolts 24, thus admitting of the adjustment of said rails to take up slack in the endless chains 25, that pass over the sprocket-wheels 19 and 20, and which constitute in part the endless carrier of my improved hay rake and elevator.

The frame of the machine is provided with upwardly and forwardly inclined tracks, designated, respectively, 26 and 27, said tracks being arranged one above the other and parallel to each other. The lower inclined track 26 consists of single or unbroken rails secured to the uprights at the sides of the frame. The upper track-rails are provided with hinged sections or switches 28, hinged near the upper ends and having beveled lower ends 29, that rest upon the correspondingly-beveled lower sections of the track 27. The upper ends of the rails of the said track 27 are, for convenience, designated 30, and it is to the lower ends of said rail-sections 30 that the switches 28 are hinged. The lower ends of the rails of the track 27 are designated 31, and the sections 31 have the beveled upper ends that normally support the beveled lower ends of the switch-rails 28. To the under sides of the rail-sections 31 are secured guide-blocks 32, forming a part of what may be described as an "inclined track" arranged diagonally between the tracks 26 and 27. At the upper ends of the guide-blocks 32 are hinged switch-rails 33, which are provided with beveled upper ends normally resting upon the rails of the track 26, near the upper end of the latter. Suitably connected with the lower ends of the rails of the lower track 26 are the rails of a rearwardly-extending horizontal track 34, forming a rearward continuation of the track 26. Uprights 35, rising from the track-rails 34, have attached to their inner sides the curved rails or guides 36, the upper ends of which are extended forwardly above the lower ends of the rail-sections 31 of the upper track 27. To the curved guides 36, at the upper front ends of the latter, are hinged the switch-rails 37, having beveled upper ends normally resting upon the rail-sections 31 and terminating just below the points at which the switch-rails 28 rest upon said rail-sections.

Caster-wheels 39, to support the rear end of the frame, are swiveled in suitable bearings 40, attached to the frame near the rear end of the latter.

The front uprights 13 of the frame are connected by a cross-bar 41, to which is hinged a cross-piece 42. To the latter are attached a series of downwardly and rearwardly extending slats 43, which constitute the floor of the machine and the lower ends of which may rest upon a cross-piece 44, secured to the under sides of the sills.

The endless chains 25 of the machine are provided with a series of carriages or carriers 45, each of which is composed of a suitable frame, preferably rectangular in shape and provided at its front end with bearings, in which is journaled a transverse shaft or axle 46, carrying flanged wheels or pulleys 47, adapted to travel upon the tracks of the machine. The extended ends of the axle 46 of each carriage have bearings in links of the chains 25, specially constructed links 48, having such bearings, being provided at suitable intervals in the chains. The rear ends of the carriage-frames 45 have bearings in which are journaled the rake-heads 49, which are provided with curved rake-teeth 50, of ordinary construction. The extended ends of the rake-head 49 carry the flanged wheels 51, which are similar in construction to the wheels 47, and which, like the latter, are adapted to travel upon the tracks of the machine. It will be noticed, however, that the ends of the rake-head do not project beyond the outer edges of the tracks and that they terminate inside of the carrying-chains 25. This is important in order to prevent the said rake-head from interfering with the chains. The rake-heads are provided inside of the flanged wheels 51 with disks 52, having notches 53 and 54 and radially-extending lugs or arms 55. The disks 52 are firmly secured upon the rake-heads and are adapted to turn with the latter.

The upper sides of the side pieces of the carriage-frame 45 are provided with springs 56, having downwardly-extending teeth or catches 57 and rearwardly-extended curved arms 58. The spring-catches 57 normally engage the notches 53 of the disks 52, thus holding the rake-heads and the teeth of the latter in operative position to gather and elevate the hay when the machine is in operation. When the rake-head is in this position, the arms 55 of the disks 52 extend in a downward and forward direction.

To the inner sides of the rails of the track 26, near the upper end of the latter, are attached the laterally-extending pins 59 and 60, the former of which are arranged in rear of the latter and at a slightly greater elevation. The pins 59 are adapted to engage the curved arms 58, extending rearwardly from the springs 56, having the catches 57, thereby raising said catches out of engagement with the notches 53 in the disks 52. At the same time the pins 60 will engage the arms 55 of the disk 52, turning the latter so as to trip the rake-head and discharge the load. When the arms 58 pass out of engagement with the pin 59, the spring-catches 57 will engage the notches 54 in the disks 52, thus holding the rake-head in a tripped position while the carriage descends the tracks. The rear ends of the horizontal track-sections 34 are provided with upwardly-extending arms 61, having laterally-extending pins or brackets 62, which, when the carriage reaches the lower end of the trap, will engage the curved arms 58, so as to release the spring-catches 57 from the notches 54, thus permitting the rake-head to drop by the weight of the teeth to its normal position, when the spring-catches 57 will again engage the notches 53 and hold the rake-head in operative position.

The switches 37 are provided with upwardly-extending curved or cam-shaped arms 63, standing just inside the chains 25, where they will pass outside the ends of the axle 49 and its wheels 51, but are adapted to be engaged by the front axles 46, where they project beyond the wheels 47 upon these axles, and the latter, by engaging the under sides of said cam-shaped arms, will raise or lift the free ends of the said switch-rails 37 sufficiently to enable the wheels 47 and the front axle to pass under them.

The frame of the machine is provided at its front end with bracket-rods 64, connected at their front ends with a hook 65, by means of which the machine may be connected with the rear end of a wagon or other receptacle to which the machine may be attached for operation. It will of course be understood that any desired number of rake-carriages 25 may be employed, and that the said carriages, as well as all the parts of the machine, are to be properly proportioned to admit of the operation, which is as follows:

When the machine travels over the field, a rotary motion is transmitted from the transporting-wheels to the shafts 15, carrying the sprocket-wheels 19, and thus to the endless chains, carrying the rake-carriages. The latter after passing along the horizontal track-rails 34 and gathering the hay from the ground will ascend the inclined track 26, passing under the free ends of the hinged switch-rails 33. When the upper end of the track 26 is reached, the front axle, having its ends journaled in the links of the chains, will be carried by the latter over the sprocket-wheels 19. The wheels of the rear axles do not leave the track 26; but the curved arms 58 of the spring-catches 57 will engage the pins 59, while the pins 60 will engage the arms 55 of the disks 52, thus tripping the rake-heads, as above described, and discharging the hay over the upper end of the track 26. The front axles 46 of the carriages follow the chains until the wheels 47 of said axles ride upon the upper ends or sections 30 of the rails of the track 27, continuing down along said track over the switch-rails 28 of the latter until the switch-rails 37 are reached. In the meantime the wheels 51 upon the rake-heads descending ride over the switch-rails 33 and under the free ends of the switch-rails 28, passing from thence over the switch-rails 37. By the time the wheels 51 pass off the switch-rails 37 the wheels 47 will engage the curved or cam-shaped arms 63, thus raising the free ends of the switch-rails 37 and permitting the wheels 47 to pass under the same. The wheels 47 upon the front axle—the ends of which are journaled in the chain-links—will now follow the chains over the sprocket-wheels 20 at the lower end of the frame until the front wheels 47 engage the front ends of the horizontal track-sections 34. The rear wheels 51 in the meantime pass over the curved guides 36, the curved arms 58 of the spring-catches 57 engaging the pins 62, so as to release said spring-catches from the notches 54 in the disks 52, thus permitting the rake-heads to turn to their normal position, at which the spring-catches 57 again engage the notches 53 in the disks 52. The wheels 51 now engage the rear ends of the horizontal track-sections 34, along which they travel while the front wheels begin to ascend the inclined track 26, thus causing the rake to gather the hay from the ground. The carriage now ascends the track 26 and the operation is repeated.

It is obvious that any number of rakes may be used in connection with each other, such rakes being preferably arranged to follow each other in close succession. By the construction of the machine as herein described it will be seen that the rakes do not travel around the sprocket-wheels supporting the endless chains or carriers. Consequently there is no danger of the hay being carried back with said rakes.

A suitable cover may be readily constructed over the frame of the machine to prevent the hay from being blown away in windy weather; but I have deemed it unnecessary to show such cover in the drawings hereto annexed.

Having thus described my invention, what I claim is—

1. In a hay raking and elevating machine, the combination of the frame having the inclined tracks, the short shafts or stub axles at the upper and lower ends of said frame, the endless chains passing over said sprocket-wheels, the rake-carriages having front axles journaled in links of said chains, the rake-heads journaled at the rear ends of said carriages, the flanged wheels journaled upon the front axles and the rake-heads, the notched disks mounted upon the rake-heads, and the spring-catches adapted to engage said notched disks, substantially as set forth.

2. The combination of the frame having the inclined tracks and switches arranged substantially as described, the shafts having the sprocket-wheels, the endless chains, the carriages having the front axles, the extended ends of which are journaled in links of said chains, the rake-heads journaled at the rear ends of said carriages, the flanged wheels upon the front axles and the rake-heads, the notched disks mounted upon the latter and having radial arms, spring-catches mounted upon the carriages and adapted to engage said notched disks and having rearwardly-extending curved arms, the laterally-extending pins at the upper end of the lower inclined track adapted to engage the radial arms of the notched disks and the curved arm of the spring-catches, and arms at the lower end of the frame having laterally-extending pins adapted to engage the curved arms of the spring-catches, substantially as set forth.

3. In a hay raking and elevating machine, the combination of the frame having suitable supporting-wheels, the tracks 26 and 27, the latter comprising the upper and lower sections 30 and 31 and the switches 28, the guides 32, having switches 33, the curved guides 36, having switches 37, provided with cam-shaped arms 63, the horizontal track-sections 34 at the lower end of the lower track 26, the shafts 15 and 21, having sprocket-wheels 19 and 20, the endless chains 25, the pins 59 and 60 at the upper end of the track 26, and the arms 61, having pins 62 at the rear ends of the horizontal track-sections 34, and the carriages having front axles journaled in links of the chains and rear axles or rake-heads, said axles and rake-heads being provided with flanged wheels, the notched disks mounted upon the rake-head and having radially-extending arms and the spring-catches mounted upon the carriages, adapted to engage the rake-heads and having rearwardly-extending curved arms, substantially as and for the purpose herein set forth.

4. In a hay raking and elevating machine, the combination of the frame having the inclined tracks and switches arranged substantially as described and provided with horizontal track-sections extending rearwardly from the lower inclined track, the endless chains or carriers, the rake-carriages connected with said endless chains or carriages by means of their front axles, said rake-carriages being adapted to reciprocate along the tracks, the front axles alone being connected with the chains or carriers, the rakes connected pivotally with said carriages, means for retaining said rakes in operative position, and suitable trip mechanism for discharging the loads at the upper end of the frame, substantially as set forth.

5. In a hay raking and elevating machine, the combination of the frame having the inclined tracks and switches arranged substantially as described, the endless chains or carriers, the rakes connected with the latter and the horizontal track-sections to guide said rakes over the ground at the lower end of the frame, so as to gather the hay, substantially as set forth.

6. In a hay raking and elevating machine, the combination of the frame having the inclined tracks and switches arranged substantially as set forth, the endless chains or carriers, the rake-carriers connected with the latter and having the rake-heads journaled at their rear ends, mechanism for holding said rake-heads in operative position, mechanism for tripping the rake-heads at the upper end of the frame, and the floor composed of a cross-bar hinged to the frame and having downwardly-extending slats, substantially as and for the purpose set forth.

MARTIN M. SORNBORGER.

Witnesses:
Z. W. SPANN,
J. F. BEDFORD.